United States Patent
Shirato et al.

(10) Patent No.: US 7,004,280 B2
(45) Date of Patent: Feb. 28, 2006

(54) MULTIPLEX POWER STEERING DEVICE

(75) Inventors: Ryota Shirato, Yokohama (JP); Hiroshi Mouri, Yokohama (JP); Tadashi Tamasho, Kanagawa (JP); Masahiro Kubota, Yokohama (JP); Takayuki Sonoda, Kanagawa (JP); Kiyotaka Shitamitsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/717,709

(22) Filed: Nov. 21, 2003

(65) Prior Publication Data

US 2004/0118629 A1  Jun. 24, 2004

(30) Foreign Application Priority Data

Dec. 18, 2002  (JP)  ............................. 2002-365999

(51) Int. Cl.
*B62D 5/04* (2006.01)
(52) U.S. Cl. .................. 180/446; 180/443; 701/42
(58) Field of Classification Search ............... 180/402, 180/442, 443, 446, 417, 421, 422; 701/41, 701/42
See application file for complete search history.

(56) References Cited

U.S. PATENT DOCUMENTS

| 6,015,023 | A  | * | 1/2000 | Mukai et al. ............... 180/446 |
| 6,209,677 | B1 |   | 4/2001 | Bohner et al. |
| 6,370,459 | B1 | * | 4/2002 | Phillips ....................... 701/41 |
| 6,904,346 | B1 | * | 6/2005 | Higashi et al. ............... 701/41 |
| 6,929,090 | B1 | * | 8/2005 | Furumi et al. .............. 180/446 |
| 6,938,721 | B1 | * | 9/2005 | Ono et al. .................... 180/402 |
| 2002/0033841 | A1 | * | 3/2002 | Rosenberg ................... 345/701 |
| 2002/0053481 | A1 | * | 5/2002 | Itakura et al. .............. 180/446 |
| 2003/0114969 | A1 | * | 6/2003 | Dominke et al. ............. 701/41 |
| 2004/0020708 | A1 | * | 2/2004 | Szabela ....................... 180/446 |
| 2004/0044443 | A1 | * | 3/2004 | Eriksson ........................ 701/1 |

FOREIGN PATENT DOCUMENTS

| DE | 198 41 101 C2 | 3/2000 |
| JP | 2002-37112 A | 2/2002 |

* cited by examiner

*Primary Examiner*—Lesley D. Morris
*Assistant Examiner*—Daniel Yeagley
(74) *Attorney, Agent, or Firm*—Foley & Lardner LLP

(57) ABSTRACT

In a multiplex power steering device for a wheeled vehicle, there is provided a control unit which includes a feedback computing part. The feedback computing part comprises an operating force estimating section that, by analyzing an output from a controlled system of actuators of a steering mechanism, estimates an output of the actuators, a disturbance estimating section that, by comparing a control signal actually fed to the actuators and the estimated output of the actuators, estimates a disturbance applied to the controlled system from the exterior, and a disturbance compensating section that adjusts the control signal in a manner to remove the estimated disturbance therefrom. The control unit calculates the control signal on the assumption that the actuators constitute a single actuator.

11 Claims, 4 Drawing Sheets

MULTIPLEX POWER STEERING DEVICE

BACKGROUND OF THE INVENTION

1. First of the Invention

The present invention relates in general to power steering devices for wheeled motor vehicles, and more particularly to power steering devices of a so-called multiplex type. More specifically, the present invention is concerned with the power steering devices of the multiplex type which includes a main steering drive system which drives a steering mechanism of the power steering device and a sub-steering drive system which drives the steering mechanism when the main steering drive system fails to operate.

2. Description of the Related Art

One of the power steering devices of the above-mentioned multiplex type is shown in Japanese Laid-open Patent Application (Tokkai) 2002-037112. The power steering device of this publication has a steering drive mechanism which comprises a main steering drive system and a sub-steering drive system. An actuator of the main steering drive system and an actuator of the sub-steering drive system are mechanically linked to each other through a link mechanism with a play and these two actuators are constantly driven under operation of an associated vehicle engine. A mutual interference detecting mechanism is provided for detecting presence/absence of interference between the main steering drive system and the sub-steering drive system. When it is found that there is some abnormality in the main steering or sub-steering drive system, a control section of the main steering or sub-steering drive system shuts down its steering drive system. While, when, under normal condition of the main steering or sub-steering drive system, it is found that a mutual interference is detected, the control section of the main steering or sub-steering drive system forcedly stops operation of the counterpart drive system, viz., the sub-steering or main steering drive system. With this, output depression of the steering driving system can be minimized and thus an assured fail-safe operation is obtained.

SUMMARY OF THE INVENTION

However, in the power steering device of the above-mentioned publication, it has been found that due to employment of the play-possessed link mechanism through which the respective actuators of the main and sub-steering drive systems are linked, the actuators are subjected to a useless movement under operation of the power steering device, that causes a wasteful consumption of electric power. Furthermore, if an abnormality of the main steering or sub-steering drive system is not detected even when such abnormality is actually present in the system, undesired possibility may occur in that, due to the work of the mutual interference detecting mechanism, one steering drive system that is being operated normally is shut down and the other steering drive system that is under malfunction is continuously operated.

It is therefore an object of the present invention to provide a multiplex power steering device which is free of the above-mentioned drawbacks.

According to the present invention, there is provided a multiplex power steering device which includes a main steering drive system and a sub-steering drive system and exhibits a stable vehicle steering operation without inducing a mutual interference between these two drive systems.

According to a first aspect of the present invention, there is provided a multiplex power steering device for a wheeled vehicle, which comprises a steering mechanism through which movement of a steering wheel is transmitted to steered road wheels of the vehicle to steer the same; a plurality of actuators that are connected to the steering mechanism to assist a steering operation effected by the steering mechanism; a sensor that detects a physical value that has a connection with a control of the steering mechanism; a control unit that outputs a control signal in accordance with the physical value detected by the sensor; and an output distributor that distributes the control signal to all of the actuators, wherein the control unit comprises a feedback computing part which includes an operating force estimating section that, by analyzing an output from a controlled system of the actuators, estimates an output of the actuators; a disturbance estimating section that, by comparing the control signal actually fed to the actuators and the estimated output of the actuators, estimates a disturbance applied to the controlled system from the exterior; and a disturbance compensating section that adjusts the control signal in a manner to remove the estimated disturbance therefrom, and wherein the control unit calculates the control signal on the assumption that the actuators constitute a single actuator.

According to a second aspect of the present invention, there is provided, in a multiplex power steering device for a wheeled vehicle, which comprises a steering mechanism through which movement of a steering wheel is transmitted to steered road wheels of the vehicle to steer the same; a plurality of actuators that are connected to the steering mechanism to assist a steering operation effected by the steering mechanism; a sensor that detects a physical value that has a connection with a control of the steering mechanism; a control unit that outputs a control signal in accordance with the physical value detected by the sensor and calculates the control signal on the assumption that the actuators constitute a single actuator; and an output distributor that distributes the control signal to all of the actuators, a method for controlling the actuators with the aid of the control unit. The method comprises estimating an output of the actuators by analyzing an output from a controlled system of the actuators; estimating a disturbance applied to the controlled system from the exterior by comparing the control signal actually applied to the actuators and the estimated output of the actuators; and adjusting the control signal in a manner to remove the estimated disturbance therefrom.

DETAILED DESCRIPTION OF THE EMBODIMENTS

In the following, two embodiments 100 and 200 of the present invention will be described in detail with reference to the accompanying drawings.

Figure 1:
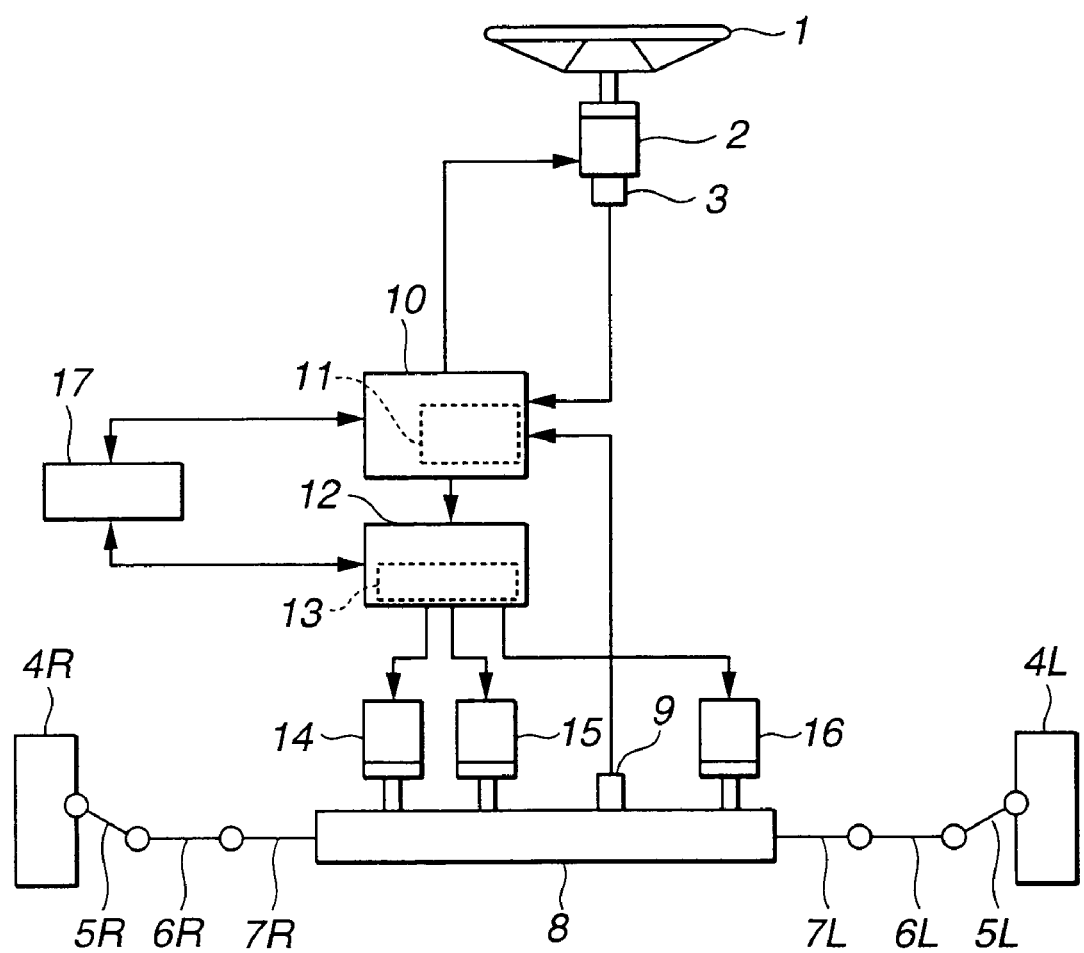
FIG. 1 is a block diagram of a multiplex power steering device which is a first embodiment of the present invention.
Figure 2:
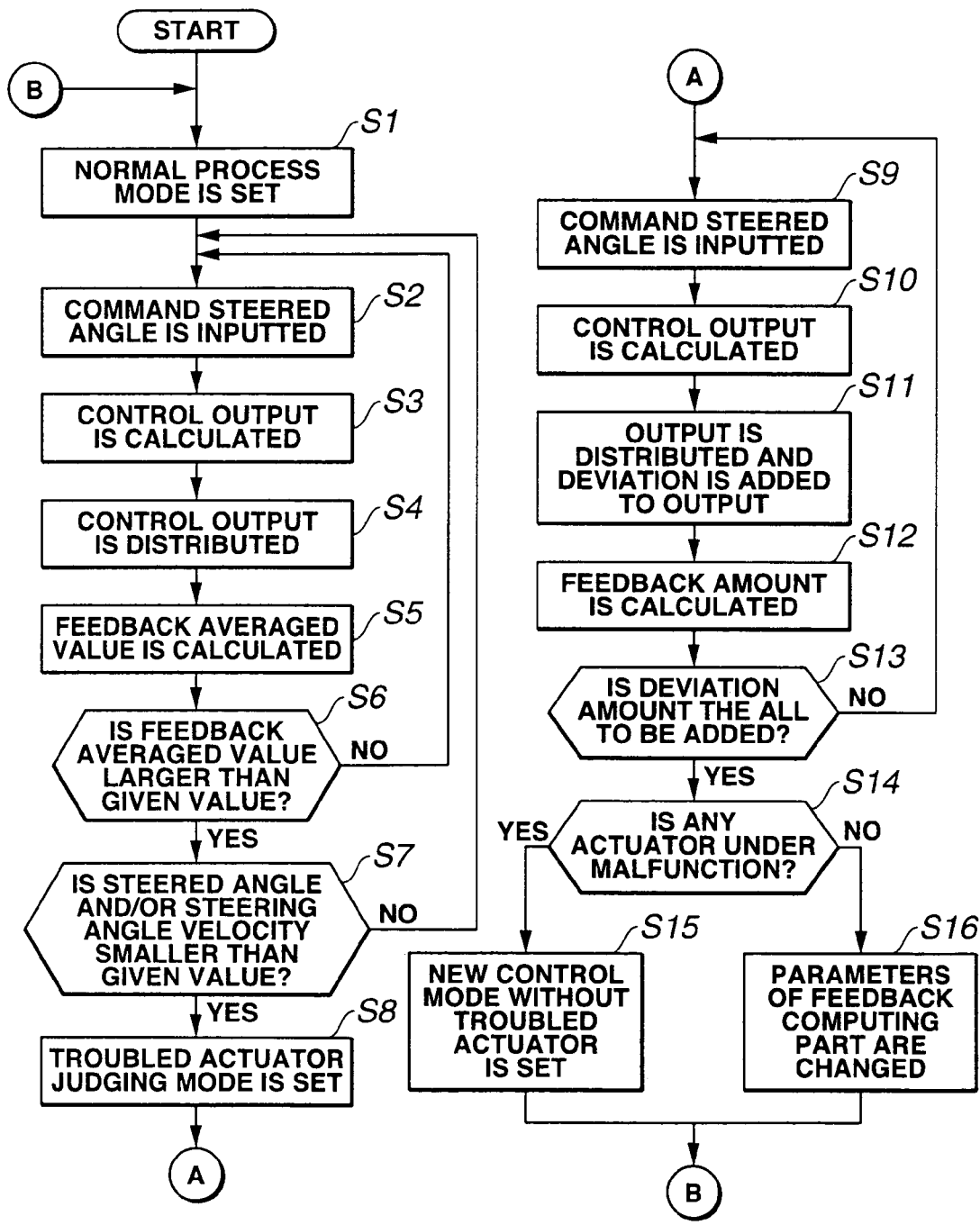
FIG. 2 is a flowchart showing operation steps executed by a control unit used in the power steering device of the first embodiment of the present invention.
Figure 3:
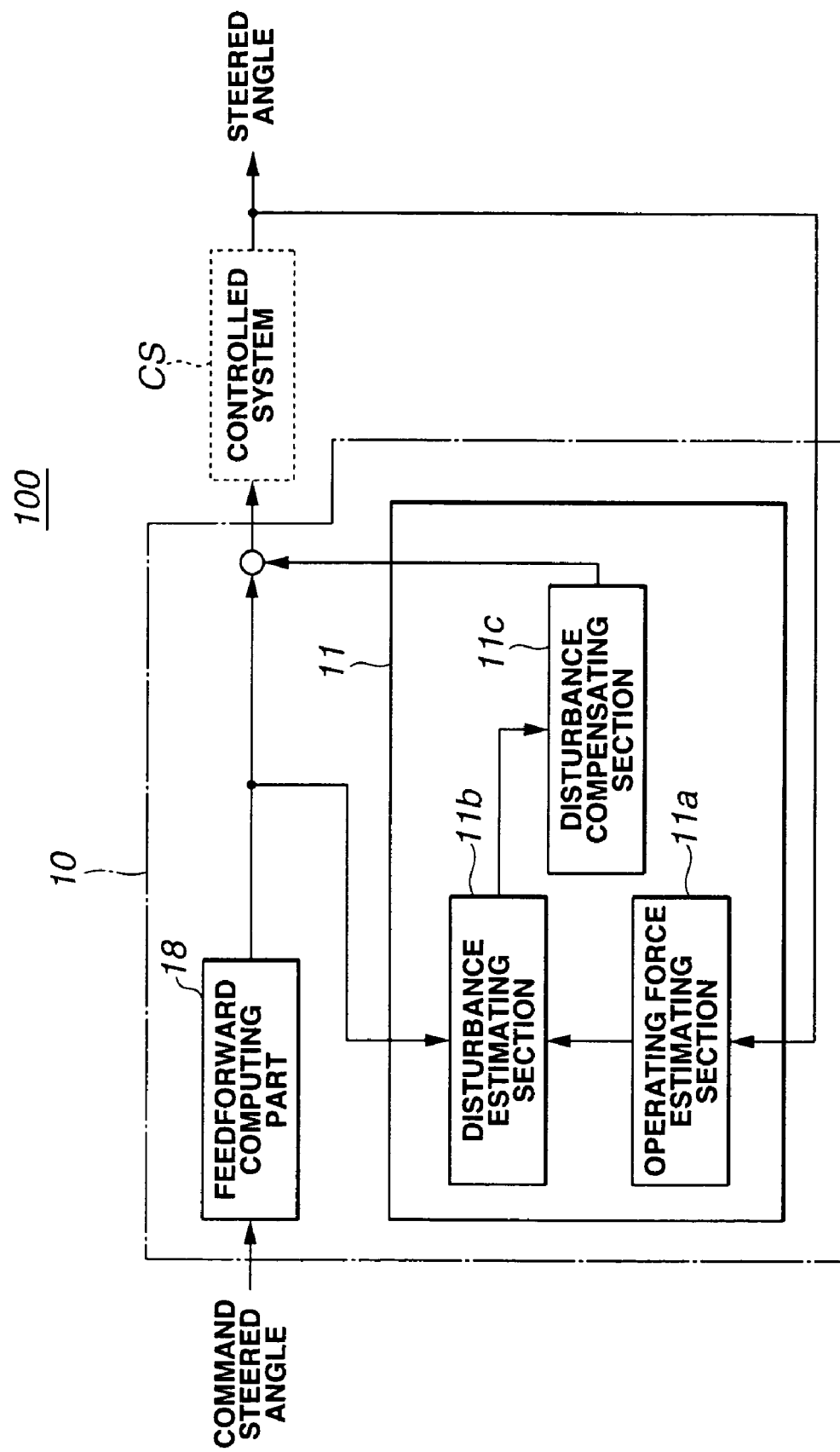
FIG. 3 is a block diagram showing contents of a control unit employed in the first embodiment.

Referring to FIGS. 1 to 3, particularly FIG. 1, there is shown a first embodiment 100 of the present invention.

In FIG. 1, denoted by numeral 1 is a steering wheel which is manipulated by a driver. Steering wheel 1 is connected to a counterforce actuator 2 which produces a counterforce for steering wheel 1. A steering angle sensor 3 is connected to counterforce actuator 2, which detects a manipulated variable (or angular position) of steering wheel 1. Denoted by numerals 4L and 4R are left front and right front steered road wheels of an associated motor vehicle, which are steered by steering wheel 1. Each front steered road wheel 4L or 4R is powered by a steering gear unit 8 through a torque transmitting mechanism that comprises a knuckle arm 5L or 5R, a tie rod 6L or 6R and a steering rod 7L or 7R.

Steering gear unit 8 is arranged between front left and right steered road wheels 4L and 4R, as shown. A steered angle sensor 9 is connected to steering gear unit 8 to sense or detect a steered angle of front steered road wheels 4L and 4R.

Between counterforce actuator 2 and steering gear unit 8, there is arranged a control unit 10 which calculates a controlled variable needed for producing a desired steered angle of front steered road wheels 4L and 4R and a controlled variable needed for causing counterforce actuator 2 to produce a desired counterforce. Within control unit 10, there is arranged a feedback computing part 11 that adjusts the controlled deviations based on output issued from steered angle sensor 9.

Connected to control unit 10 is an output distributor 12 which distributes an output from control unit 10 to three actuators 14, 15 and 16. Within output distributor 12, there is arranged a deviation adding section 13 that intentionally adds a deviation to the distributed output. Actuators 14, 15 and 16 are arranged to operate steering gear unit 8 to produce a force with which the front left and right steered road wheels 4L and 4R are steered in a desired direction.

A system adjuster 17 is arranged between control unit 10 and output distributor 12, which operates to find out one of the actuators 14, 15 and 16, that is under malfunction. That is, as will be described in detail hereinafter, by comparing the deviation added at deviation adding section 13 and the adjusted value adjusted by feedback computing part 11, the system adjuster 17 finds out a troubled actuator 14, 15 or 16. If a troubled actuator 14, 15 or 16 is found, the system adjuster 17 outputs information to both control unit 10 and output distributor 12 to drop the troubled actuator 14, 15 or 16 from the control system. While, if a troubled actuator 14, 15 or 16 is not found, the system adjuster 17 outputs information to control unit 10 to adjust parameters handled by feedback computing part 11.

With the above-mentioned arrangement, a so-called "steer-by-wire" function is obtained by the power steering device through which the characteristic of the steered angle is changeable at will relative to an operation force fed to the power steering device by a driver through steering wheel 1.

In the following, operation steps executed by a control unit for carrying out the steering control will be described with reference to the flowchart of FIG. 2. It is to be noted that the steering control starts upon ON-turning of an ignition switch (not shown).

At step S1, a normal process mode is set. In this step, a process for judging a malfunction of actuator 14, 15 or 16 is not carried out. That is, in this step S1, a process is carried out for outputting a command value to the actuator 14, 15 or 16 without adding a deviation thereto at deviation addition section 13.

At step S2, a steered angle of steering wheel 1 detected by steering angle sensor 3, which will be referred to "command steered angle" hereinafter, is inputted to control unit 10.

At step S3, in accordance with the command steered angle, a control output for the actuators is calculated. If, for example, the actuators are of a direct current induction motor, the actuators output a torque that is proportional to a current value applied thereto. A proportional factor used in deriving the torque is called torque constant. Thus, calculation is made on an operation torque that is needed for matching the steered angle of front left and right steered road wheels 4L and 4R with a target value of the steered angle calculated based on the command steered angle, and then calculation is carried out for deriving a current value needed for producing the operation torque.

Under this condition, at least two actuators (14, 15, 16) are connected to the single steering gear 8. It is to be noted that the output value for the actuators is not separately calculated. That is, the output value is calculated regarding that the actuators (14, 15, 16) constitute a single actuator. In case of the above-mentioned direct current induction motor, a gear ratio at a portion of steering gear 8 to which the motor is operatively connected and the torque constant are multiplied for all motors 14, 15 and 16, and the results are summed up to provide a constant through which one output value is calculated.

At step S4, the one output calculated at step S3 is distributed to the actuators 14, 15 and 16. In this case, the distribution may be equally made, or so made that, in view of the product of the gear ratio of the portion of steering gear 8 to which each actuator 14, 15 or 16 is operatively connected and the torque constant, a transmitted torque from the actuator to steering gear 8 is the same in all of actuators 14, 15 and 16. Furthermore, if desired, the distribution may be so made that respective transmitted torques from actuators 14, 15 and 16 to steering gear 8 show a given ratio.

At step S5, by using feedback computing part 11 in control unit 10, calculation is made on a difference between the steered angle of front left and right steered road wheels 4L and 4R, which is detected by steered angle sensor 9, and the target steered angle, and based on this difference, a feedback amount is calculated and added to the output from control unit 10.

The relationship between feedback computing part 11 and other control blocks is depicted in FIG. 3. As is seen from this drawing, within control unit 10, there is further arranged a feedforward computing part 18 to which the command steered angle is fed. As shown, the feedback computing part 11 has blocks that model a control applied to a controlled system CS which is the actuator 14, 15 or 16.

That is, feedback computing part 11 comprises an operating force estimating section 11a that, by analyzing an output from the controlled system CS, estimates an output (viz., operating force) of each actuator 14, 15 or 16 that is a quantity of state of the actuator, a disturbance estimating section 11b that, by comparing a control output (viz., control signal) from feedforward computing part 18 and an estimated output from operating force estimating section 11a, estimates a disturbance that would be applied to the controlled system from the exterior, and a disturbance compensating section 11c that, by analyzing an output from disturbance estimating section 11b, adds an adjusting value to the control signal from feedforward computing part 18 in a manner to remove the estimated disturbance. Output from feedback computing part 11 (viz., the adjusting value to be added to the control signal from feedforward computing part 18) is averaged every given time, for example, one minute.

Referring back to the flowchart of FIG. 2, at step S6, judgment is carried out as to whether the averaged value of the feedback amount calculated at step S5 is different from 0 (zero) by a given degree or not. If the control model in feedback computing part 11 is matched with the actually controlled system, the adjusting value provided by feedback computing part 11 functions to compensate the control disturbances caused by disturbances on road environment, such as cross wind, inclination of the road and the like. That is, when the associated motor vehicle runs on a road in a normal condition, it is unthinkable that a disturbance on road environment which causes the vehicle to run with its body kept inclined rightward or leftward is continuously generated for long time. Accordingly, if the averaged value of the feedback amount is different from 0 (zero) by a given degree, it can be judged that there is some malfunction in the controlled system. If NO at step S6, that is, when the averaged value of the feedback amount is not different from 0 (zero) by the given degree, the operation flow returns to step S2, and if YES at step S6, that is, when the averaged value is different from 0 (zero) by the given degree, the operation flow goes forward to step S7.

At step S7, judgment is carried out as to whether the steered angle and/or an angular velocity of steering is smaller than a given value or not. The given value of the steered angle has a range which includes an angular value that brings about a straight running of the associated motor vehicle. The given value of the angular velocity has a range which includes 0 (zero). If NO at step S7, that is, when the steered angle and/or the steering angular velocity is not smaller than the given value, the operation flow returns to step S2, and if YES, that is, when the steered angle and/or the steering angular vehicle is smaller than the given value, the operation flow goes forward to step S8.

At step S8, a troubled actuator judging mode is set. In this mode, for judging the actuator 14, 15 or 16 that is under malfunction, the deviation adding section 13 of output distributor 12 (see FIG. 1) adds a deviation to the distributed output led to the actuator 14, 15 or 16.

At steps S9 and S10, substantially same operations as those of the above-mentioned steps S2 and S3 are carried out.

At step S11, like in the above-mentioned step S4, the one output (viz., output value) calculated at step S10 is distributed to the actuators 14, 15 and 16. At the same time, outputs to be fed to the actuators 14, 15 and 16 are fed with respective deviations intentionally. That is, for example, in case wherein the three actuators 14, 15 and 16 are in operation, the output fed to the actuator 14 may be added with a deviation of +10%, the output fed to the actuator 15 may be added with a deviation of +20% and the output fed to the actuator 16 may be added with a deviation of +40%. It is however to be noted that the deviation is not added to the output at the same time but added to the output little by little, that is, for example, by repeating a process of adding 10% of the entire deviation to the output by ten times.

At step S12, like in case of the above-mentioned step S5, a feedback amount is calculated. However, in case of step S12, the feedforward output fed from feedforward computing part 18 to the feedback computing part 11 is an output that is going to be fed with the deviation at step S11.

At step S13, judgment is carried out as to whether or not the deviation amount added at step S11 is the all that is to be added to the output. If NO, that is, when the deviation amount is not the all, the operation flow returns to step S9, and if YES, that is, when the deviation amount is the all that is to be added, the operation flow goes forward to step S14.

At step S14, judgment is carried out as to whether one of the actuators 14, 15 and 16 is under malfunction or not. This judgment is carried out based on a comparison between the deviation added to the output by the system adjuster 17 and a variation of the feedback amount according to the deviation addition. Assuming the above-mentioned example (viz., +10% to actuator 14, +20% to actuator 15 and +40% to actuator 16), the following is obtained. That is, if actuator 14 is under malfunction, the feedback amount becomes equal to the deviation of 60%, if actuator 15 is under malfunction, the feedback amount becomes equal to the deviation of 50%, if actuator 16 is under malfunction, the feedback amount becomes equal to the deviation of 30%, and if all of the actuators 14, 15 and 16 are not under malfunction, the feedback amount becomes equal to the deviation of 70%. If malfunction of any actuator 14, 15 or 16 is found, the operation flow goes forward to step S15, and if malfunction is not found, the operation flow goes forward to step S16.

At step S15, parameters handled by control unit 10 are so changed or adjusted as to provide a new control mode with which operation of the power steering device 100 is carried out without usage of the actuator 14, 15 or 16 which is under malfunction. In this case, output distributor 12 is so set as not to distribute the output to the actuator 14, 15 or 16 which is under malfunction. Furthermore, in this case, electric power application to the troubled actuator 14, 15 or 16 is stopped, so that presence of the troubled actuator has substantially no influence on the operation of the new control mode. Of course, due to this power blocking, electric power saving is achieved.

At step S16, parameters handled by feedback computing part 11 of control unit 10 are so changed or adjusted that the averaged value of the feedback amount calculated at step S12 is 0 (zero).

After completion of step S15 or S16, operation flow returns to step S1 for setting the normal process mode again.

As is described hereinabove, in the power steering device of the first embodiment 100, control unit 10 is so configured as to issue a control output (viz., control signal) regarding that the actuators 14, 15 and 16 constitute a single actuator. Furthermore, control unit 10 has the feedback computing part 11 which comprises an operating force estimating section 11a that, by analyzing an output from the controlled system CS, estimates an output (viz., operating force) of each actuator 14, 15 or 16 that is a quantity of stage of the actuator, a disturbance estimating section 11b that, by comparing an output from feedforward computing part 18 and an estimated output from operating force estimating section 11a, estimates a disturbance that is applied to the controlled system, and a disturbance compensating section 11c that, by analyzing an output from disturbance estimating section 11b, adds an adjusting value to the output from feedforward computing part 18 in a manner to remove the estimated disturbance. That is, a disturbance applied to the controlled system from the exterior is estimated and the control output fed to the controlled system is adjusted in a manner to cancel the estimated disturbance. Accordingly, even when at least one of actuators 14, 15 and 16 has a malfunction, the power steering device 100 can operate stably with the remaining normal actuators without suffering from a contention between the troubled actuator and the normal actuators.

Output distributor 12 has deviation adding section 13. When the control output from control unit 10 is distributed to at least two actuators 14, 15 and 16, the deviation adding section 13 intentionally adds a deviation to the distributed control output. When the adjusting value provided by feedback computing part 11 exceeds a given value, the deviation adding section 13 adds different deviations to the outputs fed to the actuators 14, 15 and 16, and after completion of the deviation addition, the adjusting value provided by feedback computing part 11 and the deviation added by the deviation adding section 13 are compared with each other for judging or finding out the actuator 14, 15 or 16 which is under malfunction. Due to the adjusting value provided by feedback computing part 11, the troubled actuator 14, 15 or 16 can be found out without interfering with a newly set control mode which stably operates using only the remaining normal actuators.

In deviation adding section 13, addition of the deviation to the output from feedback computing part 11 is not made at the same time but made little by little, that is, gradually. Accordingly, finding the troubled actuator 14, 15 or 16 is made smoothly without interfering with a newly set control system which stably operates using only the remaining normal actuators.

The adjusting value provided by feedback computing part 11 is averaged every given time (for example, one minute). If the averaged adjusting value (viz., feedback amount) is different from 0 (zero) by a given degree, a process for judging or finding the troubled actuator 14, 15 or 16 is carried out. That is, the actuator under malfunction can be found out without suffering from the disturbance actually applied to the controlled system.

The process of adding a deviation to the distributed output at the deviation adding section 13 is carried out only when the steered angle of steering wheel 1 is within a range which includes an angular value that brings about a straight running of the associated motor vehicle and the angular velocity of steering wheel 1 is within a range which includes 0 (zero). Accordingly, even when the adjusting value provided by feedback computing part 11 is subjected to a response lag, the influence on the steering performance of the power steering device 100 can be minimized.

After completion of deviation addition, the adjusting value provided by feedback computing part 11 and the deviation added by the deviation added by deviation adding section 13 are compared for judging or finding out the actuator 14, 15 or 16 which is under malfunction. When such troubled actuator is found, a new control mode starts to operate with only the remaining normal actuators, and when a troubled actuator is not found out, parameters handled by feedback computing part 11 are adjusted. When a troubled actuator is found, output distributor 12 is so set as not to distribute the control output to the troubled actuator and an electric power application to the troubled actuator 14, 15 or 16 is stopped. Thus, appearance of the troubled actuator has substantially no influence on the operation of a newly set control mode, and at the same time, electric power saving is achieved.

In the following, a power steering device 200 of the second embodiment will be described with reference to FIG. 4.

The second embodiment 200 is similar to the above-mentioned first embodiment 100 except operation steps executed by a control unit.

Thus, only operation steps that are different from those of the above-mentioned first embodiment 100 will be described in detail in the following.

Figure 4:
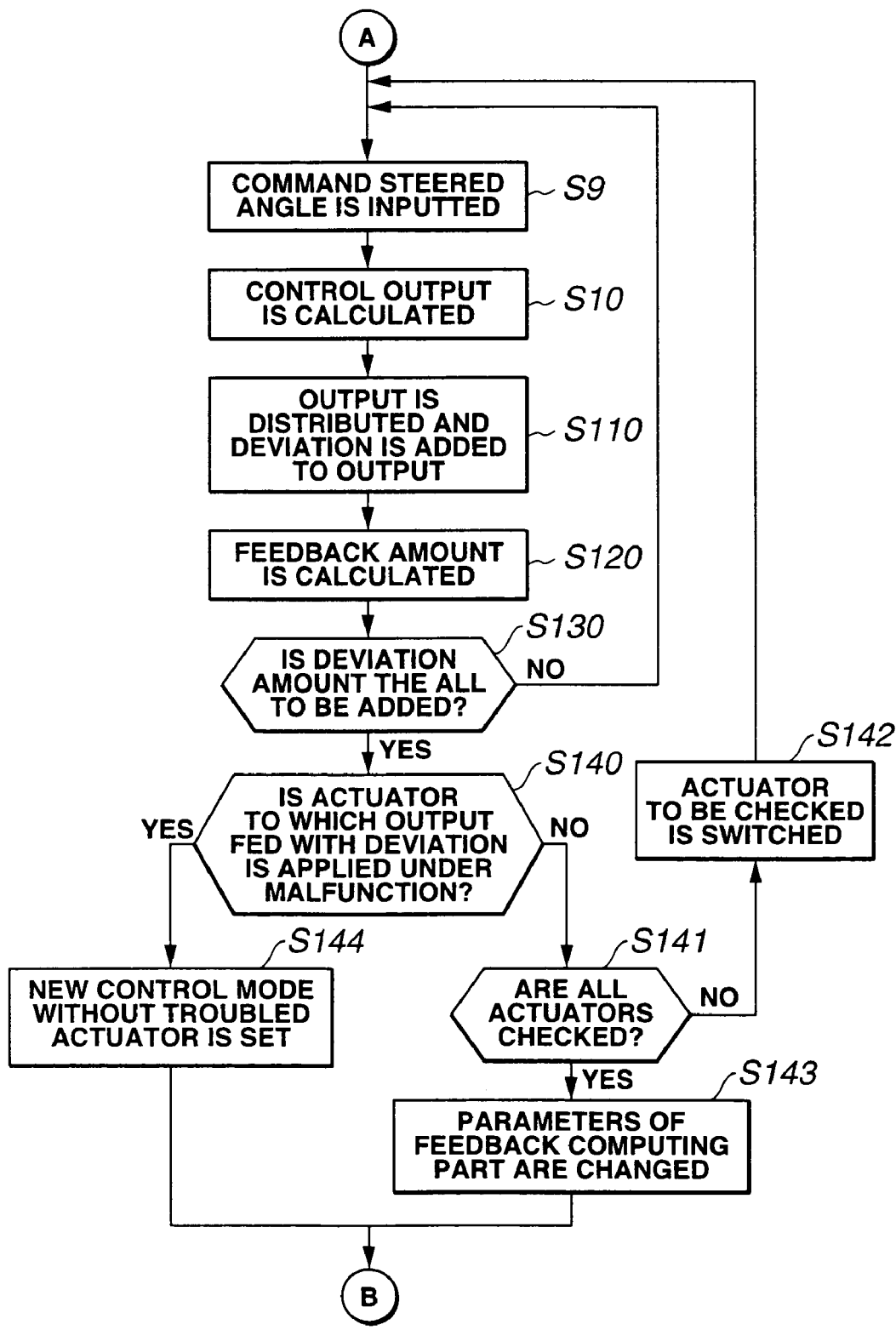
FIG. 4 is a flowchart showing operation steps executed by a control unit used in a multiplex power steering device of a second embodiment of the present invention.

As is seen from the flowchart of FIG. 4, at step S110, the one output (viz., output value) calculated at step S10 is distributed to the actuators 14, 15 and 16. In this second embodiment 200, only one of outputs to be fed to the actuators 14, 15 and 16 is fed with a deviation.

At step S120, a feedback amount is calculated like in case of step S12 of the first embodiment 100.

At step S130, judgment is carried out as to whether or not the deviation amount added at step S110 is equal to or greater than a given amount. If NO, that is, when the deviation amount is smaller than the given amount, the operation flow returns to step S9, and if YES, that is, when the deviation amount is equal to or greater than the given amount, the operation flow goes forward to step S140.

At step S140, judgment is carried out as to whether the actuator 14, 15 or 16 to which the output fed with the deviation is applied is under malfunction or not.

If NO, that is, when the actuator to which the output fed with the deviation is applied is not under malfunction, the operation flow goes to step S141.

At step S141, judgment is carried out as to whether all of the actuators 14, 15 and 16 are checked or not. If NO, that is, when all of the actuators are not checked yet, the operation flow goes to step S142 where the actuator 14, 15 or 16 to be checked is switched to another one, and then operation flow returns to step S9.

If YES at step S141, that is, when all of the actuators 14, 15 and 16 are all checked already, the operation flow goes forward to step S143 where like in case of the above-mentioned step S16, parameters handled by feedback computing part 11 are so changed or adjusted that the averaged value of feedback amount is 0 (zero).

If YES at step S140, that is, when the actuator to which the output fed with the deviation is applied is under malfunction, the operation flow goes to step S144.

At step S144, like in case of the above-mentioned step S15, parameters handled by control unit 10 are so changed or adjusted as to provide a new control mode with which operation of the power steering device 200 is carried out without the actuator 14, 15 or 16 which is under malfunction.

As is described hereinabove, in the second embodiment 200, when the adjusting value provided by feedback computing part 11 exceeds a given value, the deviation adding section 13 adds a deviation to one of the outputs fed to the actuators 14, 15 and 16, and after completion of the deviation addition, the adjusting value provided by feedback computing part 11 and the deviation added by the deviation adding section 13 are compared with each other for judging or finding out an actuator 14, 15 or 16 which is under malfunction. This troubled actuator finding process is carried out repeatedly until the troubled actuator 14, 15 or 16 is found. That is, also in the second embodiment 200, the actuator 14, 15 or 16 that is under malfunction can be assuredly found out. Furthermore, due to the adjusting value provided by feedback computing part 11, the troubled actuator can be found out without interfering with a newly set control mode which stably operates using only the remaining normal actuators.

Although the invention has been described above with reference to the embodiments of the invention, the invention is not limited to such embodiments as described above. Various modifications and variations of such embodiments may be carried out by those skilled in the art, in light of the above description.

What is claimed is:

1. A multiplex power steering device for a wheeled vehicle, comprising:
   a steering mechanism through which movement of a steering wheel is transmitted to steered road wheels of the vehicle to steer the same;
   a plurality of actuators that are connected to the steering mechanism to assist a steering operation effected by the steering mechanism;
   a sensor that detects a physical value that has a connection with a control of the steering mechanism;

a control unit that outputs a control signal in accordance with the physical value detected by the sensor; and an output distributor that distributes the control signal to all of the actuators, wherein the control unit comprises a feedback computing part which includes:

an operating force estimating section that, by analyzing an output from a controlled system of the actuators, estimates an output of the actuators;

a disturbance estimating section that, by comparing the control signal actually fed to the actuators and the estimated output of the actuators, estimates a disturbance applied to the controlled system from the exterior; and a disturbance compensating section that adjusts the control signal in a manner to remove the estimated disturbance therefrom, and wherein the control unit calculates the control signal on the assumption that the actuators constitute a single actuator.

2. A multiplex power steering device as claimed in claim 1, in which the output distributor includes a deviation adding section which intentionally adds a deviation to the control signal when the control signal from the control unit is distributed to the actuators and in which the control unit is configured to compare the added deviation with an adjusting value provided by the feedback computing part to identify the actuator which is under malfunction.

3. A multiplex power steering device as claimed in claim 2, in which the control unit is configured to carry out:

adding different deviations at the deviation addition section to the control signal fed to the actuators when the adjusting value provided by the feedback computing part exceeds a given value; and comparing the adjusting value provided by the feedback computing part and the added deviation for detecting one of the actuators which is under malfunction.

4. A multiplex power steering device as claimed in claim 2, in which the control unit is configured to carry out:

adding a deviation at the deviation addition section to the control signal fed to one of the actuators when an adjusting value provided by the feedback computing part exceeds a given value;

comparing the adjusting value provided by the feedback computing part and the added deviation for judging whether the actuator to which the control signal added with the deviation is under malfunction or not; and applying the above-mentioned two steps to the control signal fed to the other actuators to identify the actuator which is under malfunction.

5. A multiplex power steering device as claimed in claim 2, in which the control unit is configured to add, at the deviation adding section, the deviation to the control signal in such a manner that a value of the deviation is gradually increased to a needed value.

6. A multiplex power steering device as claimed in claim 2, in which the control unit is configured to carry out the process for identifying the actuator under malfunction when an averaged value of the adjusting value provided by the feedback computing part for every given time is different from 0 (zero) by a given degree.

7. A multiplex power steering device as claimed in claim 2, in which the control unit is configured to carry out the process of adding the deviation to the control signal when a steering angle of steered wheels of the associated vehicle is within a range which includes an angular value that brings about a straight running of the vehicle.

8. A multiplex power steering device as claimed in claim 2, in which the control unit is configured to carry out the process of adding the deviation to the control signal when an angular velocity of a steering wheel is within a range that includes 0 (zero).

9. A multiplex power steering device as claimed in claim 2, in which the control unit is configured to carry out the precess of adding the deviation to the control signal when a steering angle of steered wheels of the associated vehicle is within a range which includes an angular value that brings about a straight running of the vehicle and when an angular velocity of a steering wheel is within a range that includes 0 (zero).

10. A multiplex power steering device as claimed in claim 2, in which the control unit is configured to carry out:

removing an actuator under malfunction from the controlled system once the actuator is found to be under malfunction; and adjusting parameters handed by the feedback computing part once an actuator under malfunction is not identified.

11. In a multiplex power steering device for a wheeled vehicle, which comprises a steering mechanism through which movement of a steering wheel is transmitted to steered road wheels of the vehicle to steer the same; a plurality of actuators that are connected to the steering mechanism to assist a steering operation effected by the steering mechanism; a sensor that detects a physical value that has a connection with a control of the steering mechanism; a control unit that outputs a control signal in accordance with the physical value detected by the sensor and calculates the control signal on the assumption that the actuators constitute a single actuator; and an output distributor that distributes the control signal to all of the actuators, a method for controlling the actuators with the aid of the control unit, comprising:

estimating an output of the actuators by analyzing an output from a controlled system of the actuators;

estimating a disturbance applied to the controlled system from the exterior by comparing the control signal actually applied to the actuators and the estimated output of the actuators; and adjusting the control signal in a manner to remove the estimated disturbance therefrom.

* * * * *